United States Patent [19]

Takano et al.

[11] 4,401,199
[45] Aug. 30, 1983

[54] ELECTRO-MAGNETIC CLUTCH CONTROL SYSTEM FOR AUTOMOBILES

[75] Inventors: Toshio Takano, Hamuramachi; Kazutaka Mihashi, Tokyo; Kohichi Arasawa, Ohta, all of Japan

[73] Assignee: Fuji Jukogyo Kabushiki Kaisha, Tokyo, Japan

[21] Appl. No.: 243,672

[22] Filed: Mar. 13, 1981

[30] Foreign Application Priority Data

Mar. 15, 1980 [JP] Japan .................................. 55-33005

[51] Int. Cl.³ .............................................. B60K 41/28
[52] U.S. Cl. ............................... 192/0.052; 192/0.076; 192/21.5; 192/0.092
[58] Field of Search ............... 192/0.052, 0.076, 0.075, 192/0.07, 0.073, 21.5, 0.092, 0.033, 103 R; 74/701, 866

[56] References Cited

U.S. PATENT DOCUMENTS

| | | | |
|---|---|---|---|
| 2,788,872 | 4/1957 | Winther | 192/0.052 |
| 3,064,774 | 11/1962 | Maurice | 192/0.052 |
| 3,073,422 | 1/1963 | Baumann | 192/0.052 |
| 3,134,470 | 5/1964 | Weis et al. | 192/0.052 X |
| 3,203,518 | 8/1965 | Peras | 192/0.052 |
| 4,079,638 | 3/1978 | Sibeud | 74/866 |

*Primary Examiner*—George H. Krizmanich
*Attorney, Agent, or Firm*—Martin A. Farber

[57] ABSTRACT

A system for controlling an electromagnetic clutch of an internal combustion engine mounted on a vehicle, in accordance with the engine speed and vehicle speed. The electro-magnetic clutch has a drive member secured to a crankshaft of the internal combustion engine, a magnetizing coil provided in the drive member, and a driven member adjacent said drive member. A shift lever switch produces a signal during the operation of a shift lever for the transmission. A speed sensor detects the speed of said vehicle producing a signal when the speed exceeds a predetermined value, and a clutch hold switch produces a signal when the speed of the engine exceeds a predetermined value. Both signals are fed to a control circuit. The control circuit maintains current through the magnetizing coil when the speed sensor and the clutch hold switch produce respective output signals.

2 Claims, 8 Drawing Figures

ELECTRO-MAGNETIC CLUTCH CONTROL SYSTEM FOR AUTOMOBILES

BACKGROUND OF THE INVENTION

The present invention relates to a system for controlling an electromagnetic clutch, and more particularly to a system for controlling an electro-magnetic powder clutch in accordance with the driving condition of the automobile.

The electro-magnetic powder clutch comprises an annular drive member secured to the crankshaft of the engine, a magnetizing coil provided in the drive member, a driven member secured to the input shaft of the transmission leaving a gap from the drive member, and powder provided in the clutch. When the accelerator pedal is depressed, electric current flows through the magnetizing coil to magnetize the drive member. The powder aggregates in the gap by the magnetic flux, so that the driven member is coupled to the drive member through the powder. Thus, the output of the engine can be transmitted to the transmission.

When a shift lever is operated for shifting gears of the transmission, the circuit of the magnetizing coil is opened. Thus, the clutch is disengaged and the gear change can be performed by operating the shift lever. However, if the clutch is disengaged during a high speed and rapid acceleration driving condition, desirable driving of the vehicle cannot be achieved.

SUMMARY OF THE INVENTION

The object of the present invention is to provide a system which controls the current flowing through the magnetizing coil in accordance with signals obtained by detecting engine speed and the driving condition of the vehicle.

According to the present invention, there is provided a system for controlling an electromagnetic clutch of an internal combustion engine mounted on a vehicle, which has a drive member secured to a crankshaft of said internal combustion engine, a magnetizing coil provided in said drive member, a driven member adjacent said drive member, a transmission secured to said driven member having multi-stage change gears, and a shift lever for operating said transmissions, comprising a shift lever switch for producing a signal during the operation of the shift lever, a sensor for detecting the speed of the vehicle and for producing a signal when the speed exceeds a predetermined value, a clutch hold switch for producing a signal when the speed of the engine exceeds a predetermined value, and control means for keeping the current flowing through the magnetizing coil when the sensor and the clutch hold switch produce respective output signals.

Other objects and advantages of the present invention will be apparent from the following description with reference to the accompanying drawings.

DETAILED DESCRIPTION OF THE PREFERRED EMBODIMENTS

Figure 1:
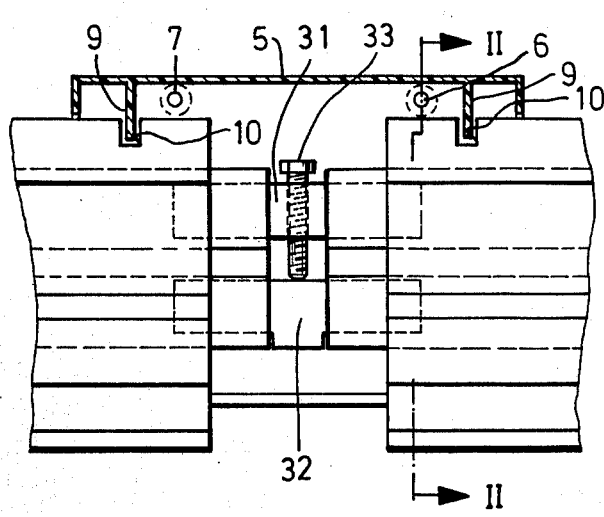
FIG. 1 is a sectional view of a transmission with an electro-magnetic clutch used in a system according to the present invention.
Figure 2:
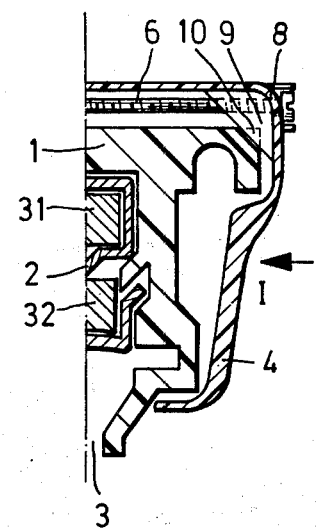
FIG. 2 is a sectional view taken along the line II—II in FIG. 1.
Figure 1:
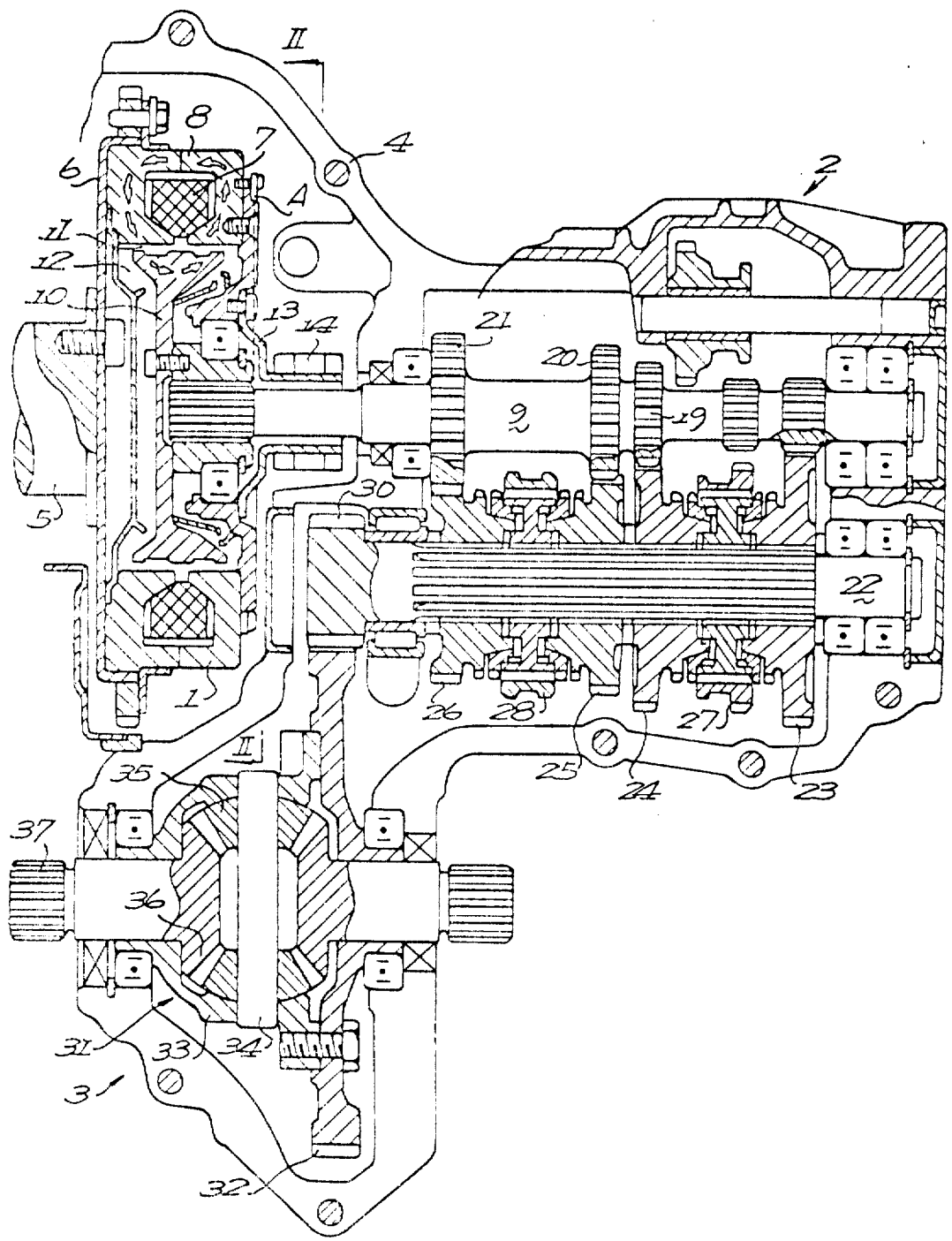
Figure 2:
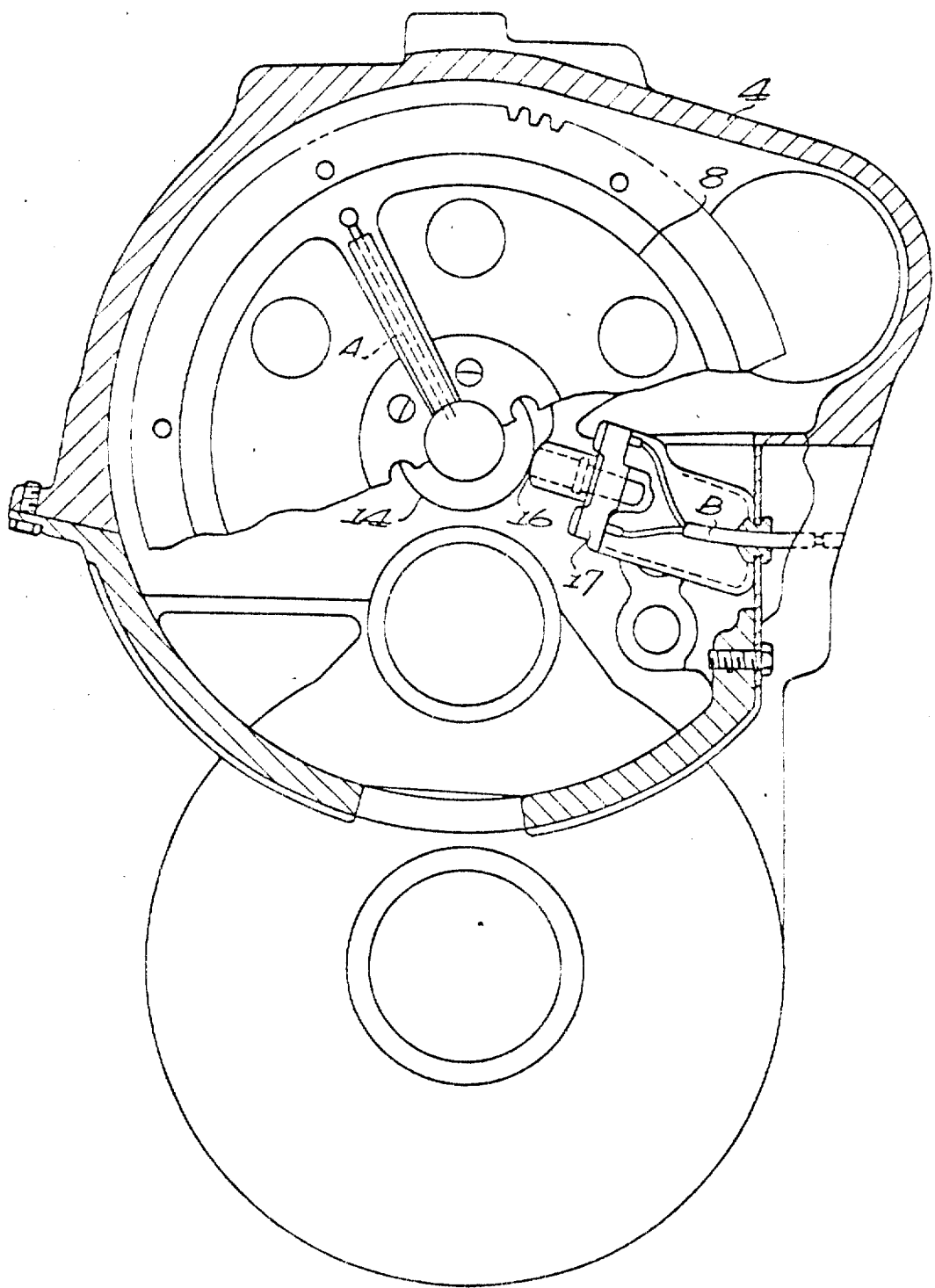

Referring to FIGS. 1 and 2 showing a transmission to which the present invention is applied, an electromagnetic powder clutch 1 is provided in a clutch case 4 and comprises a drive plate 6 attached to the end of a crankshaft 5 of an engine, an annular drive member 8 secured to the drive plate 6, a magnetizing coil 7 provided in the drive member 8, and a driven member 10 secured by a spline engagement to an input shaft 9 of a four-speed transmission 2, leaving a gap 11 from the drive member 8. Powder of magnetic material is provided in a powder chamber 12 and the gap 11 is adapted to be filled with the powder. A cap 13 is secured to the drive member 8. The cap 13 has a cylindrical portion coaxial with the input shaft 9, on which a slip ring 14 is securely provided. The slip ring 14 is connected to the drive member 8 by a lead A. A brush 16 pressed against the slip ring 14 is supported in a holder 17 and connected to a hereinafter described control means by a lead B.

When the drive member 8 is rotated by means of the drive plate 6 and crankshaft 5, the powder in the powder chamber 12 moves into the gap 11 by the centrifugal force. If the magnetizing coil 7 is excited by the current applied through the lead B, brush 16, slip ring 14 and lead A, the drive member 8 is magnetized to produce a magnetic flux passing through the driven member 10 as shown by arrows in FIG. 1. Thus, the powder is aggregated in the gap 11, so that the power of the engine is transmitted to the input shaft 9 by means of the clutch.

Figure 3:
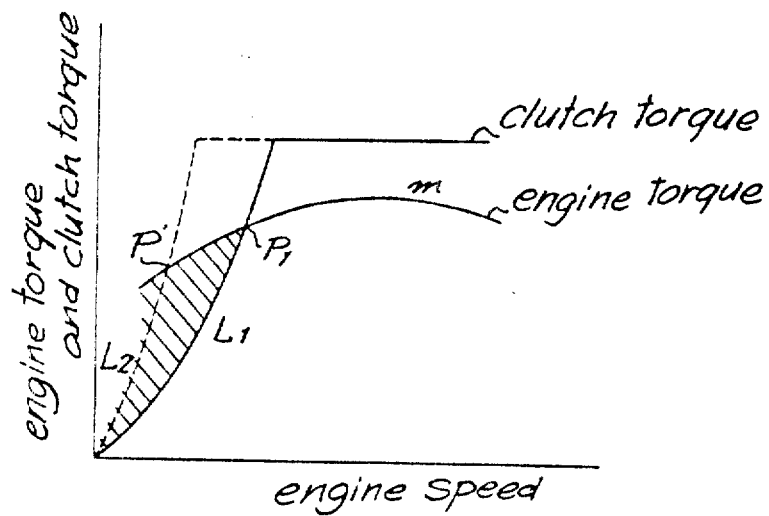
FIG. 3 is a graph showing a relation between the speed of an engine and engine torque and clutch torque.

The system is so arranged that the current to the coil 7 is increased with the increase of the speed of the engine, so that the clutch torque may be increased as shown in FIG. 3. The clutch torque in the 1st speed gear engagement position and 2nd speed gear engagement position of the transmission varies as shown by the line "$L_1$" so as to obtain a smooth starting of the vehicle. The clutch torque in the 3rd and 4th gear engagement position steeply increases as shown by the line "$L_2$". Both torque lines "$L_1$" and "$L_2$" cross the engine torque line "m" at "$P_1$" and "P'" respectively. The clutch slips in the hatched range. In the 3rd and 4th speed gear engagement positions, the clutch is coupled at a low engine torque "P'".

In the transmission 2, 1st speed to 4th speed drive gears 18 to 21 are integrally provided on the input shaft 9, which are engaged with driven gears 23 to 26 respectively. Driven gears 23 to 26 are rotatably mounted on an output shaft 22 parallel to the input shaft 9. Each of the driven gears 23 and 24 is adapted to be engaged with the output shaft 22 by operating a synchromesh mechanism 27 splined jointly connected with the output shaft 22 and axially displaceable on the output shaft 22 by a gear shift lever 76 (FIG. 4) to selectively engage rotatably with one of these gears respectively and each of driven gears 25 and 26 is engaged with the output shaft 22 by a synchromesh mechanism 28 splined jointly connected with the output shaft 22 and axially displaceable on the output shaft 22 by the gear shift lever 76 to selectively engage rotatably with one of these gears respectively in a well known manner. Further, a reverse drive gear means 29 is provided.

An output gear 30 is secured to an end of the output shaft 22 and engaged with a ring gear 32 of a differential 31 in a final reduction device 3. Thus, the output of the output shaft 22 is transmitted to an axle 37 by means of the ring gear 32, a case 33, a shaft 34, pinions 35 and side gears 36 to drive the wheels (not shown).

Figure 4:
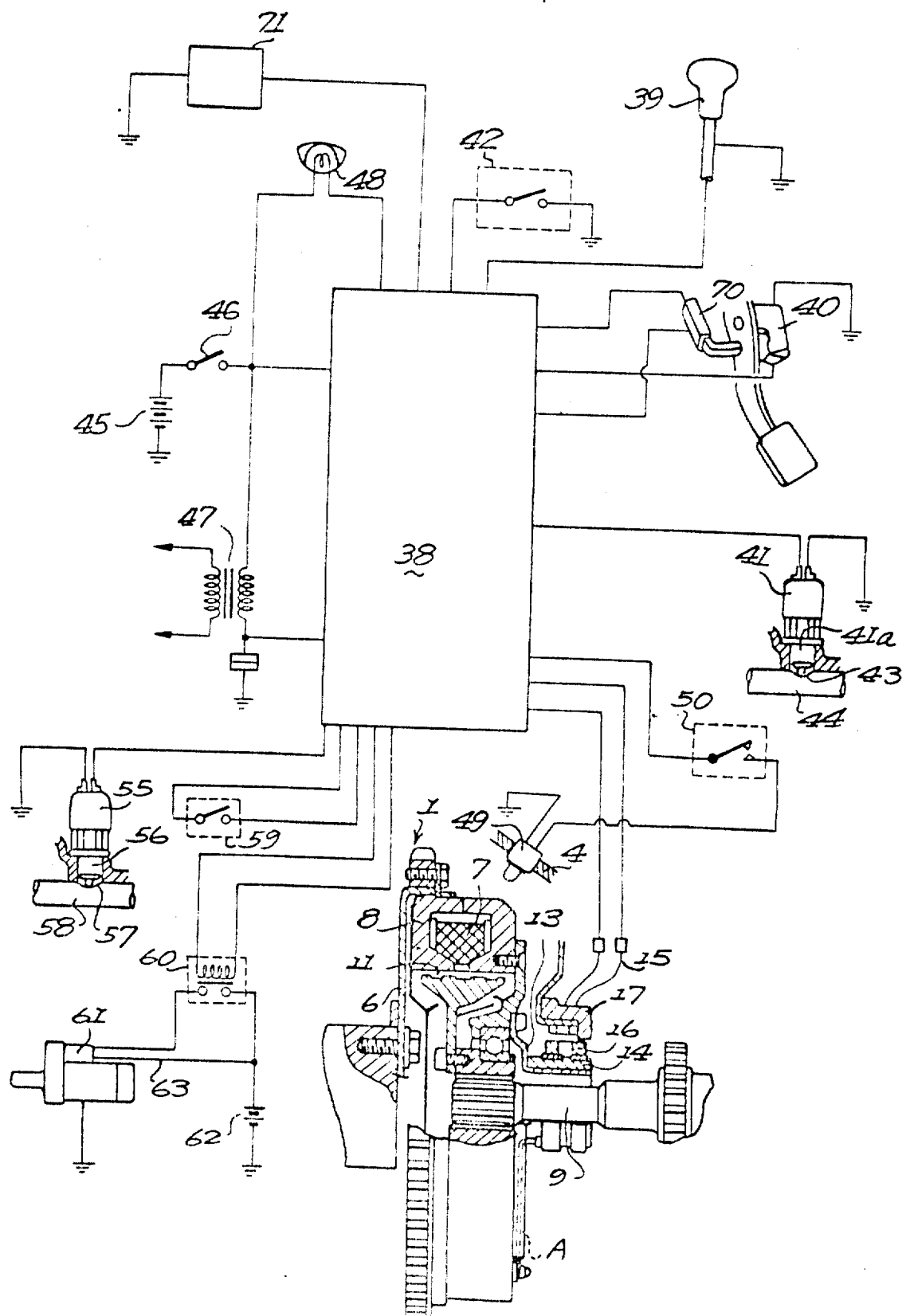
FIG. 4 shows an example of the system of the present invention.

FIG. 4 shows a control system the above described clutch. The control system comprises a control circuit means 38 and means for detecting the driving condition of the automobile. The means for detecting the driving condition comprises a shift lever switch 39 which is closed when operating force is exerted or the gear shift lever 76 of the transmission, an accelerator switch 40 closed by the accelerator pedal, a 3rd-4th switch 14 closed the in 3rd and 4th speed gear engagement positions of the transmission, a speed sensor 42, a neutral switch 55 opened in the neutral position of the gears, a starter switch 59, a safety relay 60, a clutch hold switch 70 which is closed when the accelerator pedal is depressed about ¼ of the full stroke of the pedal, and a position switch 71 which is closed when one of the gears is engaged with the corresponding gear. The 3rd-4th switch 41 comprises an actuating rod 41a pressed against a 3rd-4th shifter rail 44 by a spring (not shown). In the 3rd and 4th speed gear engagement positions, the 3rd-4th switch is closed by the actuating rod 41a. In the neutral position, the actuating rod 41a engages with a recess 43 formed in the shifter rail 44, so that the 3rd-4th switch 41 is opened. The speed sensor 42 is adapted to be closed, when the travelling speed of the automobile exceeds a predetermined level. The neutral switch 55 is similar to the 3rd-4th switch 41 in construction. In the neutral position, the actuating rod 56 engages with a recess 57 of a shift rail 58, so that the neutral switch 55 opens. The safety relay 60 is actuated by both neutral switch 55 and the starter switch 59 to close the relay contact provided between a starter 61 and a battery 62. A battery cable 63 is connected to the battery 62 and the starter 61.

The source voltage of the battery 46 is applied to the conrol circuit means 38 through a key switch 46. The control circuit means 38 is so arranged as to vary the current to the coil 7 as shown by the line "$L_1$" or "$L_2$" in FIG. 3 in accordance with the pulse from an ignition signal circuit 47 and to actuate a buzzer 48. Further, a thermo switch 49 adapted to be closed at a predetermined temperature is provided on the clutch case 4 for detecting the temperature of the clutch. A 2nd switch 50 adapted to be closed in the 2nd speed stage gear engagement position is connected to the thermo switch 49 in series.

Figure 5:
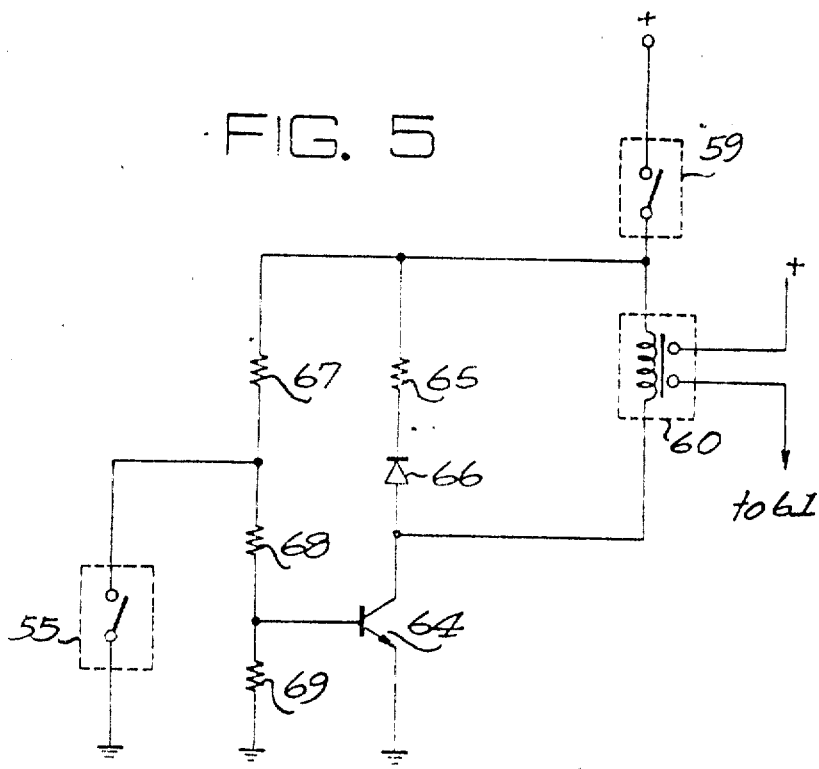
FIG. 5 is a circuit for controlling the clutch during starting of the engine.

Referring to FIG. 5, the starter switch 59, the safety relay 60 and transistor 64 are connected to each other in series. A resistor 65 and a diode 66 are connected in series and further connected to both ends of the relay 60 to form a regenerative circuit. Three resistors 67, 68 and 69 are connected between the starter switch 59 and the ground. The neutral switch 55 is connected to the junctions of resistors 67, 68.

Figure 6:
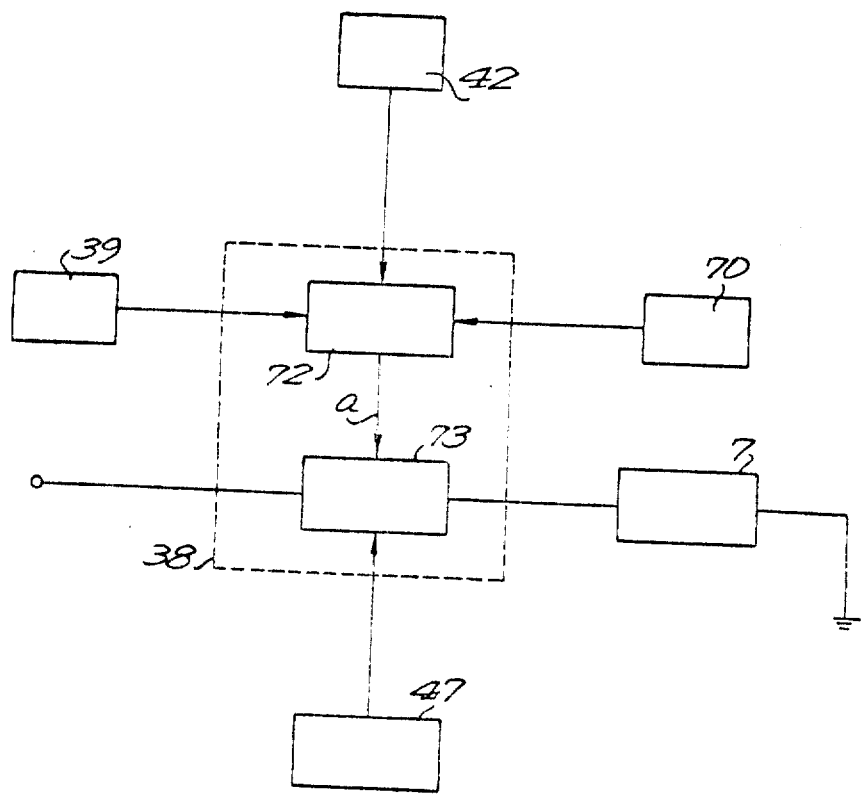
FIG. 6 is a block diagram showing a control system of the present invention.
Figure 7:
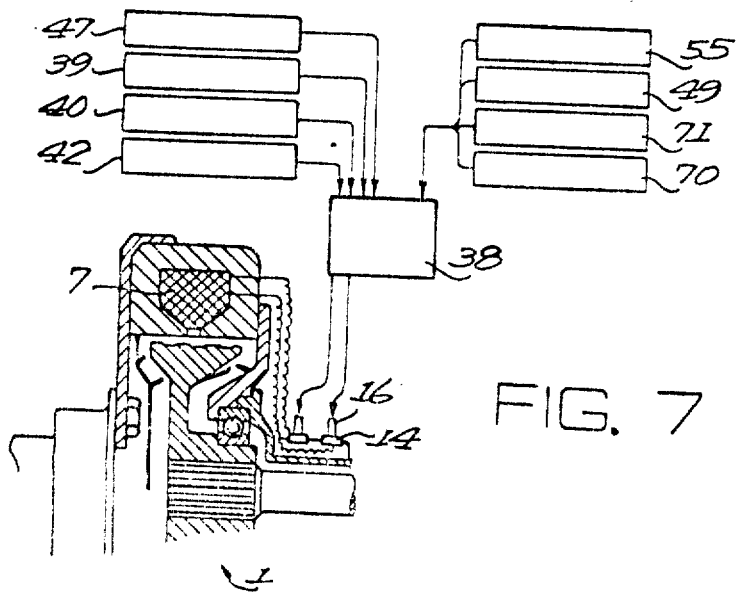
FIG. 7 is a block diagram showing a relation between various kinds of switches and clutches.

Referring to FIG. 6, the control circuit means 38 comprises a judging circuit 72 and a control circuit 73. The shift lever switch 39, the speed sensor 42 and the clutch hold switch 70 are connected to the judging circuit 72. On the other hand, the magnetizing coil 7 and the ignition signal circuit 47 are connected to the control circuit 73.

Starting of the Engine

The shift lever 76 is positioned in the neutral position thereby opening the neutral switch 55 (FIG. 5). The key switch 46 is closed and then the starter switch 59 is closed. Thus, as shown in FIG. 5, the current flows through the safety relay 60 and the transistor 64, so that the relay contact is closed. As a result, a switch (not shown) in the starter 61 is closed, so that the engine is started.

If the shift lever 76 is not in the neutral position, which means that any one of the gears in the transmission is engaged with the corresponding gear, the neutral switch 55 is closed. Thus, the transistor 64 is turned off, so that the relay 60 is deenergized. Therefore, the operation of the starter switch 59 is disabled, so that an abrupt start of the vehicle is prevented.

Starting and Driving of the Vehicle

When the accelerator switch 40 is closed, the control circuit means 38 is operated to apply the output voltage of the battery 45 to the magnetizing coil 7 of the clutch. When the automobile is started when the gears are in the 1st speed gear engagement position (i.e. 1st gear), the clutch torque varies according to the line "$L_1$" in FIG. 3, whereby the vehicle can be smoothly started. In the 2nd speed gear engagement position (i.e. 2nd gear), if the temperature of the clutch is low and the thermo switch 49 is opened, closing of the 2nd switch 50 does not produce an effect on the control circuit means 38. Thus, the automobile can also be started according to the clutch torque of the line "$L_1$" in the 2nd speed gear engagement position as starting in the 1st speed gear engagement position. If the transmission is changed into the 3rd or 4th speed gear engagement position, the 3rd-4th switch 41 is closed, so that the clutch torque varies according to the line "$L_2$" as the accelerator pedal is depressed.

Thus, it is impossible to start the vehicle in the 3rd or 4th speed gear engagement positions, and such a condition is signaled by a warning buzzer 48.

If the automobile is frequently started in the 2nd speed gear engagement position and the temperature of the clutch rises to a predetermined level, the thermo switch 49 is closed. Therefore, when the 2nd switch 50 is closed by operating the gear shift lever 76 and shifting into 2nd gear, the control means 38 is operated to produce the clutch torque of the line "$L_2$". It makes it impossible to start the vehicle in the 2nd speed gear engagement position. At that time, the warning buzzer 48 also operates.

Thus, the vehicle can be started in the 1st speed engagement position only and damage to the clutch may be prevented.

Changing of the Transmission Ratio

Figure 8:
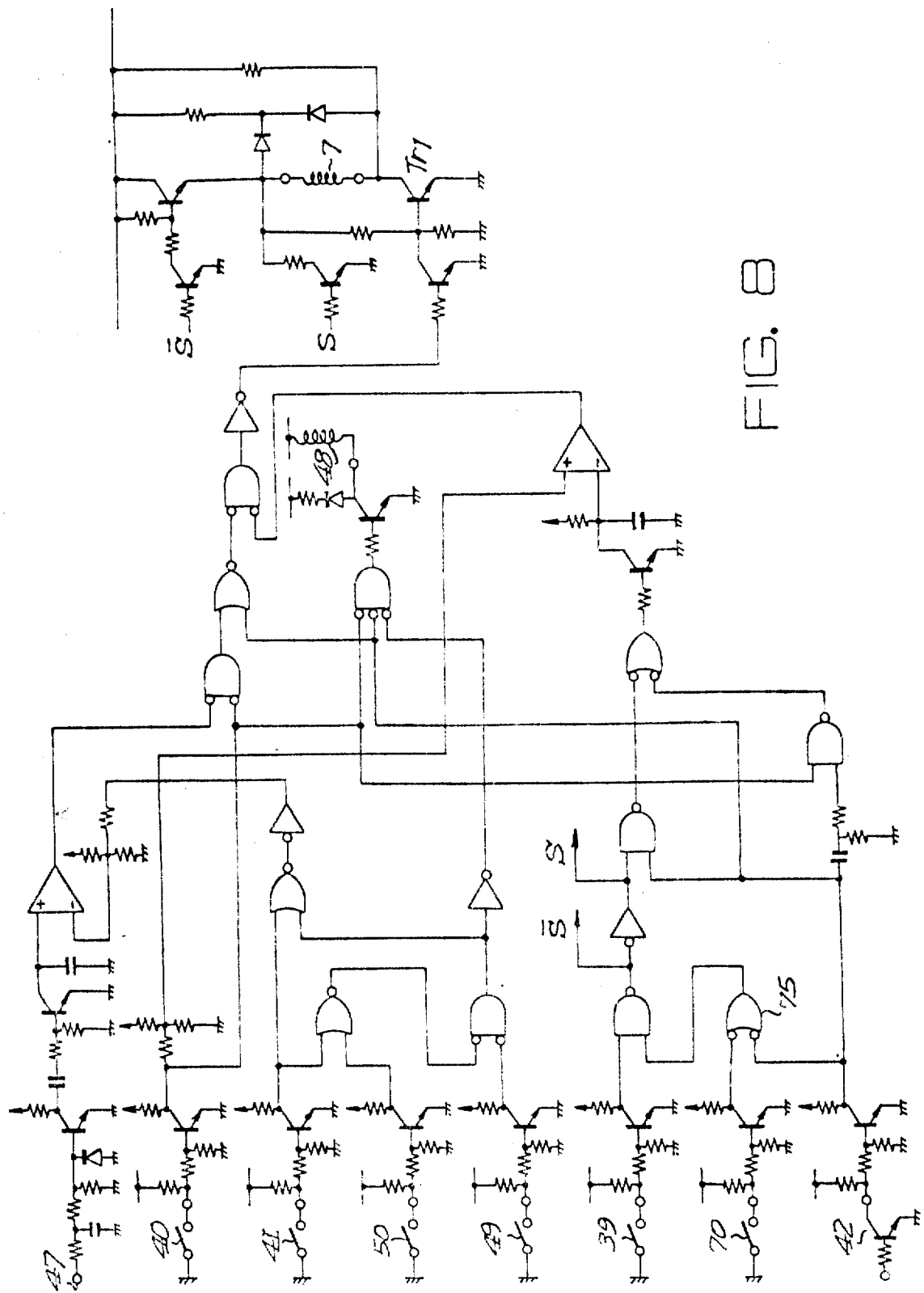
FIG. 8 is an example of the control circuit.

Referring to FIGS. 6 and 8, when the shift lever 76 is urged, in any shifting direction by manual operation, the shift lever switch 39 is closed. The signal generated by closing the shift lever switch 39 operates the control circuit means 38, which causes a transistor $Tr_1$ in the circuit of the magnetizing coil 7 to become nonconductive. Thus, the clutch is disengaged. Subsequently, the shift lever 76 is shifted to one of the gear engagement positions through the neutral position. When the operator's hand is removed from the shift lever 76 the shift lever switch 39 opens. Therefore, the transistor $Tr_1$ is conducted, so that the magnetizing coil 7 is excited again to engage the clutch.

It is undesirable to permit the gear change operation at any time during the driving of the vehicle irrespective of the driving condition. If the clutch is disengaged during a high speed and rapid accelerating driving condition, desirable driving of the vehicle cannot be achieved. In accordance with the present invention, the clutch cannot be disengaged in such driving conditions. When the speed of the vehicle is lower than a predetermined rate (20 Km/h), the speed sensor 42 produces a signal which is inputted to a digital logic gate (OR gate 75) in the judging circuit 72. The digital logic gate renders the signal by the operation of the shift lever switch 39 effective on the judging circuit 72 and the control circuit 73 irrespective of the signal by the operation of the clutch hold switch 70. Therefore, the transistor $Tr_1$ of the circuit of the magnetizing coil 7 is rendered non-conductive by the operation of the control circuit 73 and the gears may be shifted.

When the speed of the vehicle exceeds the set value (20 Km/h), the signal of the speed sensor 42 changes to the other mode whereby the input signal to the digital logic gate is changed. By the change of the input signal, the output of the digital logic gate changes according to the input signal from the clutch hold switch 70. If the accelerator pedal is not depressed over said predetermined degree, the output signal from the clutch hold switch 70 does not change the output of the digital logic gate. Therefore, shifting the gears may be performed by operating the shift lever 76. However, if the accelerator pedal is depressed over the predetermined degree, the clutch hold switch 70 is closed whereby the input signal to the digital logic gate is changed. Thus, the output of the logic gate changes, which changes the signal by the operation of the shift lever switch 39. By such a signal change of, the control circuit 73 keeps the transistor $Tr_1$ of the circuit through the magnetizing coil 7 in the conductive state. Therefore, the gear change cannot be performed unless the accelerator pedal is returned to reduce the engine speed.

Thus, in accordance with the present invention, it is possible to prevent disengagement of the clutch during a high speed and rapid accelerating driving.

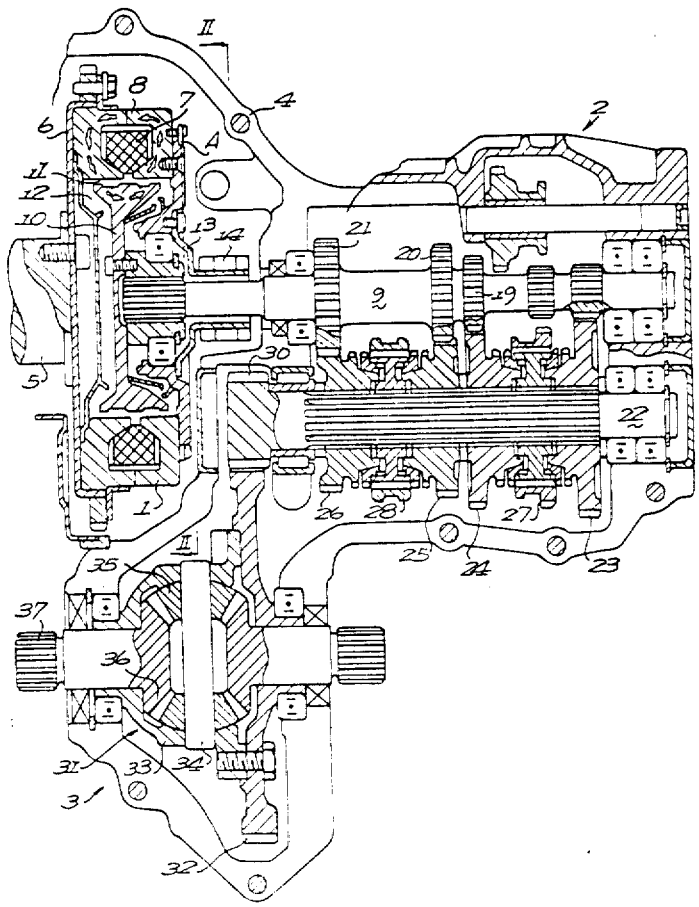

What is claimed is:

1. A system for controlling an electro magnetic clutch of an internal combustion engine mounted on a vehicle, which has a drive member secured to a crankshaft of said internal combustion engine, a magnetizing coil provided in said drive member, a driven member adjacent said drive member, a transmission secured to said driven member having multi-stage change gears, and a shift lever for operating said transmission, comprising a shift lever switch means for producing a signal during the operation of said shift lever for disconnecting the magnetizing coil;

a sensor means for detecting the speed of said vehicle and for producing a signal when the speed exceeds a predetermined value;

a clutch hold switch means for producing a signal when the speed of the engine exceeds a predetermined value; and control means for overriding said shift lever switch means keeping current flowing through said magnetizing coil when said sensor means and said clutch hold switch means produce respectively output signals.

2. A system for controlling an electromagnetic clutch of an internal combustion engine mounted on a vehicle according to claim 1 wherein said clutch hold switch is a switch means operated by an accelerator pedal of said vehicle when the accelerator pedal is depressed a predetermined degree.

* * * * *

UNITED STATES PATENT AND TRADEMARK OFFICE
CERTIFICATE OF CORRECTION

PATENT NO. : 4,401,199             Page 1 of 8

DATED : August 30, 1983

INVENTOR(S) : Toshio Takano et al

It is certified that error appears in the above-identified patent and that said Letters Patent is hereby corrected as shown below:

The title page should be cancelled to appear as per attached title page.

The drawing should be cancelled to appear as per attached sheets.

Column 6, Line 34 should read --according to claim 1 wherein said clutch hold switch means is--

Signed and Sealed this

Twelfth Day of August 1986

[SEAL]

Attest:

DONALD J. QUIGG

Attesting Officer      Commissioner of Patents and Trademarks

United States Patent
Takano et al.

[11] 4,401,199
[45] Aug. 30, 1983

[54] ELECTRO-MAGNETIC CLUTCH CONTROL SYSTEM FOR AUTOMOBILES

[75] Inventors: Toshio Takano, Hamuramachi; Kazutaka Mihashi, Tokyo; Kohichi Arasawa, Ohta, all of Japan

[73] Assignee: Fuji Jukogyo Kabushiki Kaisha, Tokyo, Japan

[21] Appl. No.: 243,672

[22] Filed: Mar. 13, 1981

[30] Foreign Application Priority Data

Mar. 15, 1980 [JP] Japan ................. 55-33005

[51] Int. Cl.³ .......................... B60K 41/28
[52] U.S. Cl. ................. 192/0.052; 192/0.076; 192/21.5; 192/0.092
[58] Field of Search ............ 192/0.052, 0.076, 0.075, 192/0.07, 0.073, 21.5, 0.092, 0.033, 103 R; 74/701, 866

[56] References Cited

U.S. PATENT DOCUMENTS

| | | | |
|---|---|---|---|
| 2,788,872 | 4/1957 | Winther | 192/0.052 |
| 3,064,774 | 11/1962 | Maurice | 192/0.052 |
| 3,073,422 | 1/1963 | Baumann | 192/0.052 |
| 3,134,470 | 5/1964 | Weis et al. | 192/0.052 X |
| 3,203,518 | 8/1965 | Peras | 192/0.052 |
| 4,079,638 | 3/1978 | Sibeud | 74/866 |

Primary Examiner—George H. Krizmanich
Attorney, Agent, or Firm—Martin A. Farber

[57] ABSTRACT

A system for controlling an electromagnetic clutch of an internal combustion engine mounted on a vehicle, in accordance with the engine speed and vehicle speed. The electro-magnetic clutch has a drive member secured to a crankshaft of the internal combustion engine, a magnetizing coil provided in the drive member, and a driven member adjacent said drive member. A shift lever switch produces a signal during the operation of a shift lever for the transmission. A speed sensor detects the speed of said vehicle producing a signal when the speed exceeds a predetermined value, and a clutch hold switch produces a signal when the speed of the engine exceeds a predetermined value. Both signals are fed to a control circuit. The control circuit maintains current through the magnetizing coil when the speed sensor and the clutch hold switch produce respective output signals.

2 Claims, 8 Drawing Figures